United States Patent

[11] 3,587,334

| [72] | Inventor | Gordon Willis<br>Cambridge, Mass. |
|---|---|---|
| [21] | Appl. No. | 850,737 |
| [22] | Filed | Aug. 18, 1969 |
| [45] | Patented | June 28, 1971 |
| [73] | Assignee | Computervision Corporation, Waltham, Mass. |

[54] EXTENSIBLE ECCENTRIC LINKAGE
4 Claims, 5 Drawing Figs.

[52] U.S. Cl. ................................................. 74/89
[51] Int. Cl. ....................................... F16h 27/02
[50] Field of Search ........................................ 74/89, 41, 42, 43, 44, 45, 46, 47, 48

[56] References Cited
UNITED STATES PATENTS

| 793,047 | 6/1905 | Brown | 74/89 |
| 2,183,436 | 12/1939 | Towler et al. | 74/45 |
| 2,194,035 | 3/1940 | Sologaistoa | 74/46 |
| 2,274,601 | 2/1942 | Hartgering et al. | 74/41 |
| 2,775,800 | 1/1957 | Ellms | 74/89 |

Primary Examiner—Fred C. Mattern, Jr.
Assistant Examiner—Wesley S. Ratliff, Jr.
Attorney—Chittick, Pfund, Birch, Samuels & Gauthier ABSTRACT: An eccentric linkage assembly includes an extensible link pivoted eccentrically at one end to a rotatable driving member and at its other end to a pivoted member. A fixed position stop is provided adjacent the pivoted member to stop the pivoted member at a point when said link is tensioned so that any overrotation of the driving member merely extends the link to further press the pivoted member against the position stop. In a modified form of the invention, the link is both extensible and contractable so that a second position stop may be provided adjacent the pivoted member to fix its position at a point when the link is subjected to compression so that any overrotation of the driving member at this point merely causes the link to contract to urge the pivoted member against the second stop.

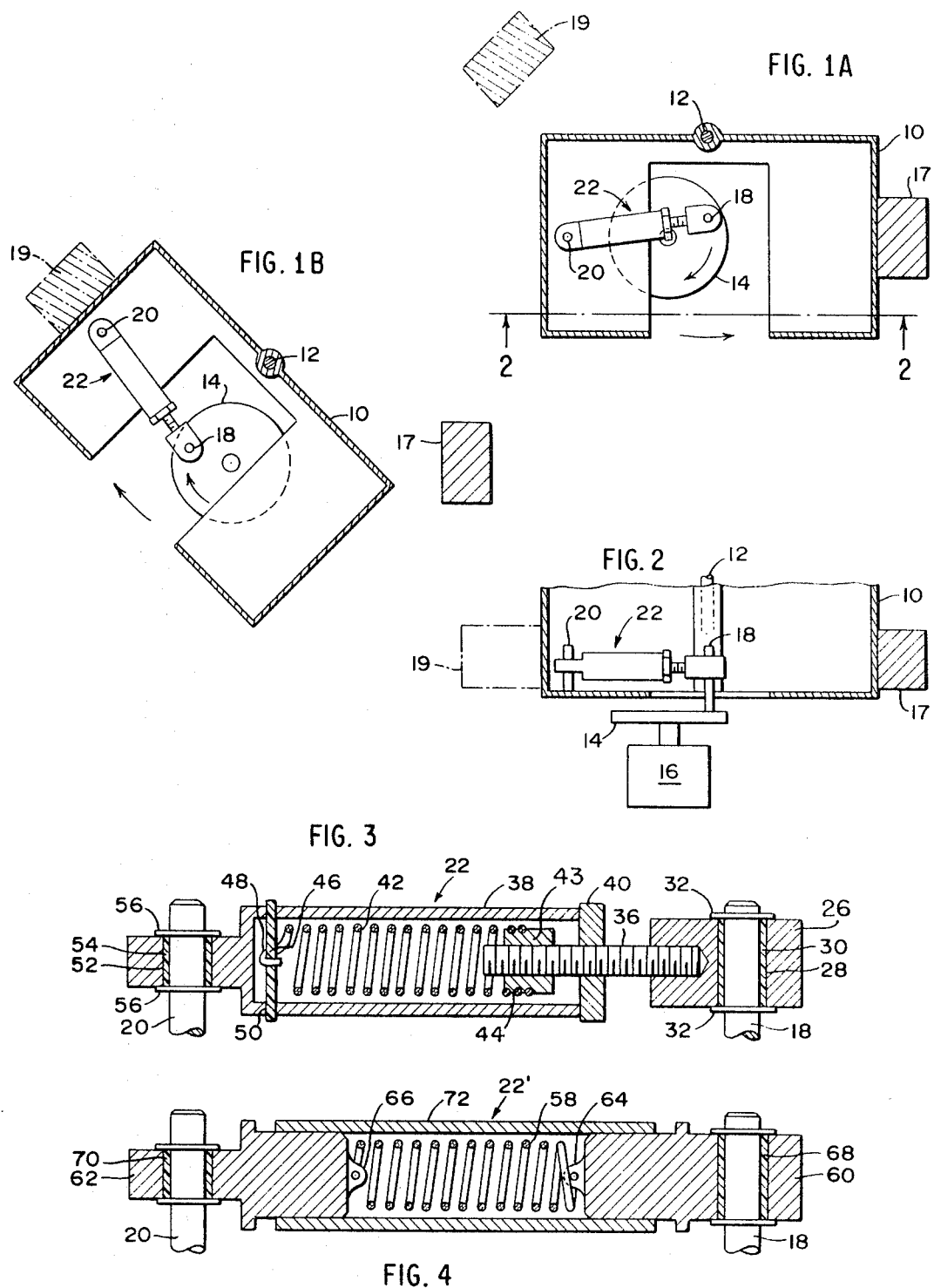

EXTENSIBLE ECCENTRIC LINKAGE

This invention relates to eccentric linkages and is more particularly concerned with an extensible eccentric linkage for accurately returning a pivoted member to a specified position.

To pivot a member between one position and another, it is common practice to provide a rotatable driving member, such as a drive wheel, which is connected to the pivoted member by a rigid link eccentrically secured to the drive wheel. For most purposes such linkages are entirely satisfactory. However, when the pivoted member must be accurately positioned at one end of its movement, conventional eccentric drives have been unsatisfactory because the inertia of the drive wheel and its associated motor, together with friction losses, make it impossible to stop the drive wheel at a precise point in its rotation to accurately repeat the positioning of the pivoted member.

One setting in which it is repeatedly necessary to bring a pivoted member back to a precise location is in the production of silicon semiconductive wafers where the wafers must be precisely registered with a mask before exposing the wafer-mask sandwich to ultraviolet light. The sandwich is viewed through a microscope during registration, and then the microscope is swung away for exposure of the sandwich from an ultraviolet light source also carried on the microscope turret. After exposure, the microscope is swung back to view the registration of another wafer with the mask and the process is repeated. To avoid minute adjustment of the microscope position each time it is swung back to its viewing position, it is highly desirable to drive its turret with a linkage capable of compensating for the inaccuracy of the drive wheel's rotary repeatability while fixing the turret against a stop. The description of the invention will therefore proceed with reference to a microscope turret, although it should be appreciated that the invention applies to any setting where it is desired to accurately repeat the positioning of a pivoted member of any type.

In accordance with the invention, a rotatable driving member such as a drive wheel is connected to a pivoted driven member, e.g., a microscope turret, pivoted about an axis parallel to and offset from the drive wheel's axis by an extensible link eccentrically pivoted to the drive wheel and also pivoted on the drive member. The link includes an extensible spring and means for preventing the spring from buckling when the link is under compression so that through most of its travel the link functions as a convention rigid eccentric. A fixed stop is positioned adjacent the turret to stop the turret in its viewing position at a point when the link is tensioned so that further rotation of the drive wheel merely extends the spring to resiliently force the turret against the stop, thereby firmly positioning the turret in its viewing position regardless of the drive wheel's lack of repeatability.

By enabling the turret to be accurately returned to its viewing position after each time it has been swung away for exposure, the need for further adjustments of the microscope's position is obviated to increase production efficiency of the silicon wafers as well as reducing operator fatigue.

A modified version of the invention provides a link having a spring capable of both extending and contracting the length of the link to firmly position the turret at both ends of its travel. For this purpose, a second fixed stop may be provided to stop the turret at a point when the link is under compression to use the link's resilient compressive force to position the turret on its second or exposure position.

It is therefore a primary object of the invention to provide an eccentric linkage capable of repeatedly positioning a pivoted member against a fixed stop regardless of the repeatability of the driving member.

This and other objects, features and advantages of the invention will become more apparent as the description proceeds with continued reference to the drawings wherein:

FIG. 1A is a plan view in section of the invention connected to a microscope turret and showing the turret in its first or viewing position;

FIG. 1B is a view similar to FIG. 1A showing the turret in its second or exposure position;

FIG. 2 is a fragmented side elevation in section taken along line 2-2 of FIG. 1A;

FIG. 3 is a sectional elevation of one form of an extensible link useful in positioning the turret member at one end of its travel; and FIG. 4 is a view similar to FIG. 3 of a modified version of the link useful in positioning the turret at both ends of its travel.

With reference now to FIGS. 1A and 1B, a driven member 10 such as a microscope turret is pivotally mounted on a vertical mast 12. In order to pivot the turret 10 from its first or viewing position seen in FIG. 1A to its second or exposure position shown in FIG. 1B, a drive wheel 14 is mounted on the drive shaft of a motor 16 (FIG. 2) with the axis of rotation of the drive wheel 14 parallel to and offset from the axis of the mast 12. A first stop 17 is positioned adjacent the turret to position the turret in its first position (FIG. 1A) and a second fixed stop 19 may be provided to fix the position of the turret in its second position (FIG. 1B).

As best seen in FIG. 2, a mounting post 18 is eccentrically secured to the drive wheel 14 while a similar mounting post 20 is provided the floor of the turret 10. To translate the rotary motion of the drive wheel 14 into a pivoting motion of the turret 10, an elongated extensible link generally indicated at 22 extends between and is pivotally mounted to the posts 18 and 20.

The structure of the preferred embodiment of the telescoping link 22 useful in accurately positioning the turret 10 at one end of its travel is best seen in FIG. 3 wherein a drive wheel mounting block 26 has a post receiving aperture 28 for receiving the driving wheel post 18. The aperture 28 has an antifriction sleeve 30 as of Teflon to lubricate the joint during relative rotation of the link 22 and the drive wheel 14, and snap rings 32 prevent axial displacement of the mounting block 26. The mounting block 26 also has a tapped hole 34 for receiving one end of a rigid threaded shaft 36. The shaft 36 is disposed towards the turret mounting post 20 and passes partially into the open end of a rigid hollow tube 38. An adjustable facing member such as nut 40 threaded onto the shaft 36 bears against the open end of the tube 38 to limit the extend of the tube-shaft overlap.

One end of a coil spring 42 is attached to a second nut 43 as indicated at 44 and the other end is hooked around a post 46 as indicated at 48, which post is fixedly positioned within the tube 38 by force-fitting through apertures 50 to resiliently connect the tube 38 and the nut 40. The nut 43 may be rotated to adjust the rest tension in the spring 42 and the overall length of the link 22 may be varied by rotating the nut 40. The end of the tube 38 remote from the driving wheel mounting block 26 has a turret post receiving aperture 52 also sleeved with antifriction material 54 to mount the links 22 on the turret post 20 while snap rings 56 axially secure the links 22 to the post 20.

In operation, when it is desired to swing the turret 10 away from its viewing position, the drive wheel 14 may be rotated in a clockwise direction in excess of 180° to pivot the turret 10 about its mast 12 in the clockwise direction to the position shown in FIG. 1B. It should be apparent that during such travel, the link 22 is subjected to compression which forces the nut 40 into the tube 38 so that the spring 42 doesn't buckle and the link 22 remains rigid during this portion of its cycle.

To return the turret 10 to its viewing position, the drive wheel 14 may be rotated in a clockwise direction to its original position to cause the turret 10 to swing in a counterclockwise direction about its mast 12 from the disposition shown in FIG. 1B to its original exposure position shown in FIG. 1A. It is desirable to accurately position the turret 10 at this point in its cycle so that the microscope mounted thereon does not have to be adjusted each time the cycle is repeated. I have found that the requisite positioning repeatability cannot be obtained from reliance solely on a rigid linkage associated with the motor 16, such as a cam or rigid eccentric link, because the inertia and friction inherent in the motor and drive assembly introduce an error on the order of 3°. Therefore the rigid stop 17 is fixed in a position adjacent the turret 10 to positively control its position. During the return portion of its cycle, the link 22 is subjected to tension as it pulls the turret 10. The stop 17 is positioned to stop the turret 10 in its return travel at a point just before the link 22 is released from tension, i.e., 5° or so of drive wheel rotation before the link 22 and the center of the drive wheel 14 again fall in a straight line. Over rotation of the drive wheel 14 at this point will merely cause the spring 42 to extend, which extension tensions the spring 42 to resiliently force the turret 10 against the stop 17. To provide the requisite tension, the nut 43 should preferably be adjusted to have the spring 42 at least neutral and desirably slightly tensioned when the nut 40 bottoms on the tube 38.

In some cases it may be desired to accurately position the pivoted turret 10 at both ends of its cycle. To that end a modified form of the invention, as shown in FIG. 4, provides an extensible link 22' which includes a coil spring 58 secured at its ends to a driving wheel mounting block 60 and a turret post mounting block 62 as by passing it through eyelets 64 and 66, respectively. The mounting blocks 60, 62 have antifriction sleeved apertures 68, 70 to pivotally receive the driving wheel post 18 and the turret post 20, the snap rings 72, 74 complete the pivoted connections. A hollow tube 72 open at both ends and having a length shorter than the rest length of the spring 58 surrounds the spring 58.

Referring once again to FIGS. 1A and 1B, as the turret 10 is pivoted from its first to its second position, the spring 58 is subjected to compression. The snug-fitting tube 72 prevents the spring 58 from buckling under such compression but allows the link 22' to contract somewhat during this portion of the cycle. The stop 19 is positioned adjacent the turret 10 at the point before the link 22' is released from compression, i.e., about 5° of drive wheel rotation before the link 22' and the center of the drive wheel 14 are aligned, so that the compressed spring tends to resiliently urge the turret 10 against the stop 19 to accurately control its disposition at that end of its cycle. Over rotation of the drive wheel at this juncture merely further compresses the spring 58 to reinforce the position control. During the return portion of the turret cycle, the link 22' is again subjected to tension, which tension causes the link to extend when the first turret position has been again assumed to force the turret 10 against the first stop 17 at the other end of this travel as described above.

Having thus described the invention, it is my intention to cover all modifications and equivalents which do not depart from the spirit and scope thereof as defined by the appended claims.

I claim:
1. An eccentric linkage assembly for accurately fixing the position of a pivoted driven member, said assembly comprising:
   a rotatable driving member;
   a driven member pivotally mounted about an axis parallel to and offset from the axis of said driving member;
   an elongated extensible link pivoted at one end eccentrically to said rotatable driving member and pivoted at the other end to said driven member to pivot said driven member between a first and a second position in response to rotation of said driving member, said extensible link including extensible resilient means capable of resiliently extending the length of said link when tensioned and means for preventing said resilient means from buckling when said link is subjected to compression; and,
   a first position stop for fixing the position of said pivoted driven member in its first position at a point when said extensible link is tensioned, whereby said link tension causes said resilient means to resiliently urge said pivoted driven member against said first position stop to securely fix its first position.

2. The linkage assembly of claim 1 which further includes a second position stop for fixing the second position of said pivoted driven member at a point when said extensible link is subjected to compression, said extensible link resilient means being also capable of resiliently contracting the length of said link to resiliently urge said pivoted driven member against said second position stop to securely fix its second position.

3. The linkage assembly of claim 1 in which said extensible resilient means comprises a coil spring and said resilient means buckling preventing means includes a rigid tube open at one end in which said coil spring is disposed, an adjustable facing member positioned adjacent the open end of said tube, and a rigid member on which said adjustable facing member is mounted, one end of said spring being secured within said tube and the other end being secured to said rigid member, said facing member being adapted to bear against the open end of said tube when said link is under compression, whereby said link is rigid during compression but is extensible when tensioned.

4. The linkage of claim 2 in which said resilient means comprises a coil spring and said resilient means buckling preventing means comprises a rigid hollow tube open at both ends disposed around said spring, said tube having a length shorter than the rest length of said spring, whereby said spring may be compressed to contract said link when compressed and may be extended to lengthen said link when subjected to tension.